United States Patent
Suzuki et al.

(10) Patent No.: US 11,697,087 B2
(45) Date of Patent: Jul. 11, 2023

(54) DUST SOLIDIFICATION APPARATUS

(71) Applicant: SINTOKOGIO, LTD., Nagoya (JP)

(72) Inventors: Takashi Suzuki, Nagoya (JP); Shintaro Nishikawa, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 348 days.

(21) Appl. No.: 17/007,705

(22) Filed: Aug. 31, 2020

(65) Prior Publication Data

US 2021/0154615 A1 May 27, 2021

(30) Foreign Application Priority Data

Nov. 26, 2019 (JP) .................. 2019-212937

(51) Int. Cl.
*B01D 46/48* (2006.01)
*B08B 15/00* (2006.01)

(52) U.S. Cl.
CPC .............. *B01D 46/48* (2013.01); *B08B 15/00* (2013.01)

(58) Field of Classification Search
CPC ........... B01D 46/48; B08B 15/00; B09B 3/20; B30B 15/32; B30B 11/025; B30B 11/02; B30B 15/302
See application file for complete search history.

(56) References Cited

U.S. PATENT DOCUMENTS

| 4,932,853 A * | 6/1990 | Unger ................. B29C 39/10 425/452 |
| 2009/0126533 A1 | 5/2009 | Yamaguchi et al. |
| 2021/0154615 A1* | 5/2021 | Suzuki .................. B08B 15/00 |

FOREIGN PATENT DOCUMENTS

| DE | 102018120529 A1 * | 1/2020 | ........... B30B 11/005 |
| JP | H04-123898 A | 4/1992 | |
| JP | 2010-069536 A | 4/2010 | |
| JP | 2011-156560 A | 8/2011 | |

* cited by examiner

*Primary Examiner* — Dung H Bui
(74) *Attorney, Agent, or Firm* — Oliff PLC

(57) ABSTRACT

A dust solidification apparatus that prevents dust from scattering with a simple structure and that can accurately perform solidification of dust. A dust solidification apparatus comprising: an apparatus body; a hopper for storing dust D, the hopper being provided on the apparatus body; a forming member provided within the hopper, the forming member having a forming hole; and a pressurizing rod that is configured to freely advance and withdraw with respect to the forming hole, wherein the pressurizing rod advances into the forming hole to solidify dust loaded therein, thereby obtaining a solidified substance K, and openings of the forming hole are open within the hopper.

7 Claims, 6 Drawing Sheets

DUST SOLIDIFICATION APPARATUS

TECHNICAL FIELD

The present invention relates to a dust solidification apparatus.

BACKGROUND

Dust containing fumes generated during laser processing, plasma processing, and welding, etc. of metallic materials and the like can cause serious health hazards if inhaled by workers. Therefore, in order to keep the working environment clean, a dust collector is operated to remove the dust from the working environment. The dust collected in the dust collector is in a state with a small bulk density, and since it is difficult to handle dust in this state, this dust is compressed, solidified, and processed into a body that is easy to handle.

Regarding the solidification of dust, Patent Document 1 discloses an apparatus for solidifying waste. In this document, waste stored in a hopper is supplied into a tub-type compression chamber provided below the hopper and solidified by being compressed from the upper and side portions of the compression chamber. Thereafter, Patent Document 1 describes that the compression chamber moves laterally and the solidified substance is pushed and discharged by means of a pushing means.

Patent Document 2 discloses a processing apparatus that supplies collected fine powder to a forming chamber by means of a screw conveyor, and compresses and solidifies the fine powder by lowering a compression slider when the fine powder reaches a predetermined amount. Compression is performed several times by additionally supplying fine powder, and when the solidified and formed item reaches a predetermined size, a discharge hole provided below the forming chamber is opened and the compression slider is lowered to discharge the formed item.

Patent Document 3 discloses a solidifying apparatus that supplies powder particles collected by a dust collector to a forming chamber provided below the hopper, and solidifies the powder particles by a forming member and an opening and closing member. Patent Document 3 describes that the forming chamber is arranged horizontally and the solidified powder particles are moved outside the forming chamber by the forming member, and the solidified powder particles that adhere to the tip of the forming member are caused to fall by a cleaning member that descends from above.

CITATION LIST

Patent Literature

Patent Document 1: JP H04-123898 A
Patent Document 2: JP 2010-069536 A
Patent Document 3: JP 2011-156560 A

SUMMARY OF INVENTION

Technical Problem

In the solidification apparatus described in Patent Documents 1 to 3 above, since the forming chamber for solidifying dust is provided outside the dust collector, the dust that leaks out of a gap between the forming chamber and a pressurizing member during the solidification operation may scatter. Moreover, the structure of the apparatus may become complicated if the apparatus is enclosed with a cover or the like and employs suctioning to prevent scattering.

The present invention is provided in view of the above circumstances and the problem to be solved by the present invention is to provide a dust solidification apparatus that prevents dust from scattering with a simple structure and that can accurately perform solidification of dust.

Solution to Problem

The present invention employs the following means in order to solve the above problem.

Specifically, a dust solidification apparatus of the present invention comprises an apparatus body; a hopper for storing dust, the hopper being provided on the apparatus body; a forming member provided within the hopper, the forming member having a forming hole; and a pressurizing rod that is configured to freely advance and withdraw with respect to the forming hole, wherein the pressurizing rod advances into the forming hole to solidify dust filled therein, thereby obtaining a solidified substance, and openings of the forming hole are open within the hopper.

According to this invention, since the forming member is provided within the hopper and the openings of the forming hole of the forming member are open within the hopper, dust is prevented from scattering during dust solidification.

In one aspect of the present invention, the dust solidification apparatus comprises a closing rod facing the pressurizing rod, wherein the forming hole is a structure that penetrates through the forming member, the closing rod freely advances into and withdraws from a first opening of the forming hole, and the pressurizing rod freely advances into and withdraws from a second opening of the forming hole.

According to such a configuration, since the closing rod freely advances into and withdraws from the first opening and the pressurizing rod freely advances into and withdraws from the second opening, solidification of dust can be performed accurately.

In one aspect of the present invention, a first wall and a second wall are provided facing the first opening and the second opening of the forming hole, respectively, a first hole and a second hole that are each positioned on an axis of the forming hole and that have one or both of the closing rod and the pressurizing rod reciprocating therein are formed on the first wall and the second wall, and the solidified substance solidified by the pressurizing rod and the closing rod within the forming hole is transportable to the outside of the hopper through the first hole or the second hole together with the closing rod and the pressurizing rod.

According to such a configuration, since the first hole and the second hole are positioned on the axis of the forming hole and one or both of the closing rod and the pressurizing rod reciprocate therein, the solidified dust can be reliably transported.

In one aspect of the present invention, a discharge hole that intersects with the first hole or the second and that extends in a vertical direction is formed in the apparatus body, proximate to the outside of the hopper, and when the solidified substance sandwiched between the closing rod and the pressurizing rod is moved into the discharge hole, the solidified substance is dropped into and discharged by the discharge hole.

According to such a configuration, since the dust solidification apparatus comprises a discharge hole that intersects with the first hole or the second and that extends in a vertical direction, the solidified dust can be easily discharged.

In one aspect of the present invention, a dust-proof hole that intersects with the first hole and the second hole and that extends in a vertical direction is formed in the apparatus body, proximate to the hopper and/or the discharge hole.

According to such a configuration, since the dust-proof hole that intersects with the first hole and the second hole and that extends in a vertical direction is formed, dust can be prevented from entering into the cylinder that drives the rod.

In one aspect of the present invention, the closing rod and the pressurizing rod have a cross-section formed into a circular or polygonal contour shape.

In one aspect of the present invention, the closing rod and the pressurizing rod are formed so as to have a maximum dimension, through the center of the cross-section, of 10 mm to 100 mm, and the forming hole is formed so as to have a gap of 0.2 mm to 2 mm with respect to the closing rod and the pressurizing rod.

According to such a configuration, the present invention can be implemented with an appropriate configuration.

Effects of Invention

According to the present invention, it is possible to provide a dust solidification apparatus that prevents dust from scattering with a simple structure and that can accurately perform solidification of dust.

DESCRIPTION OF EMBODIMENTS

Embodiments

Figure 1:
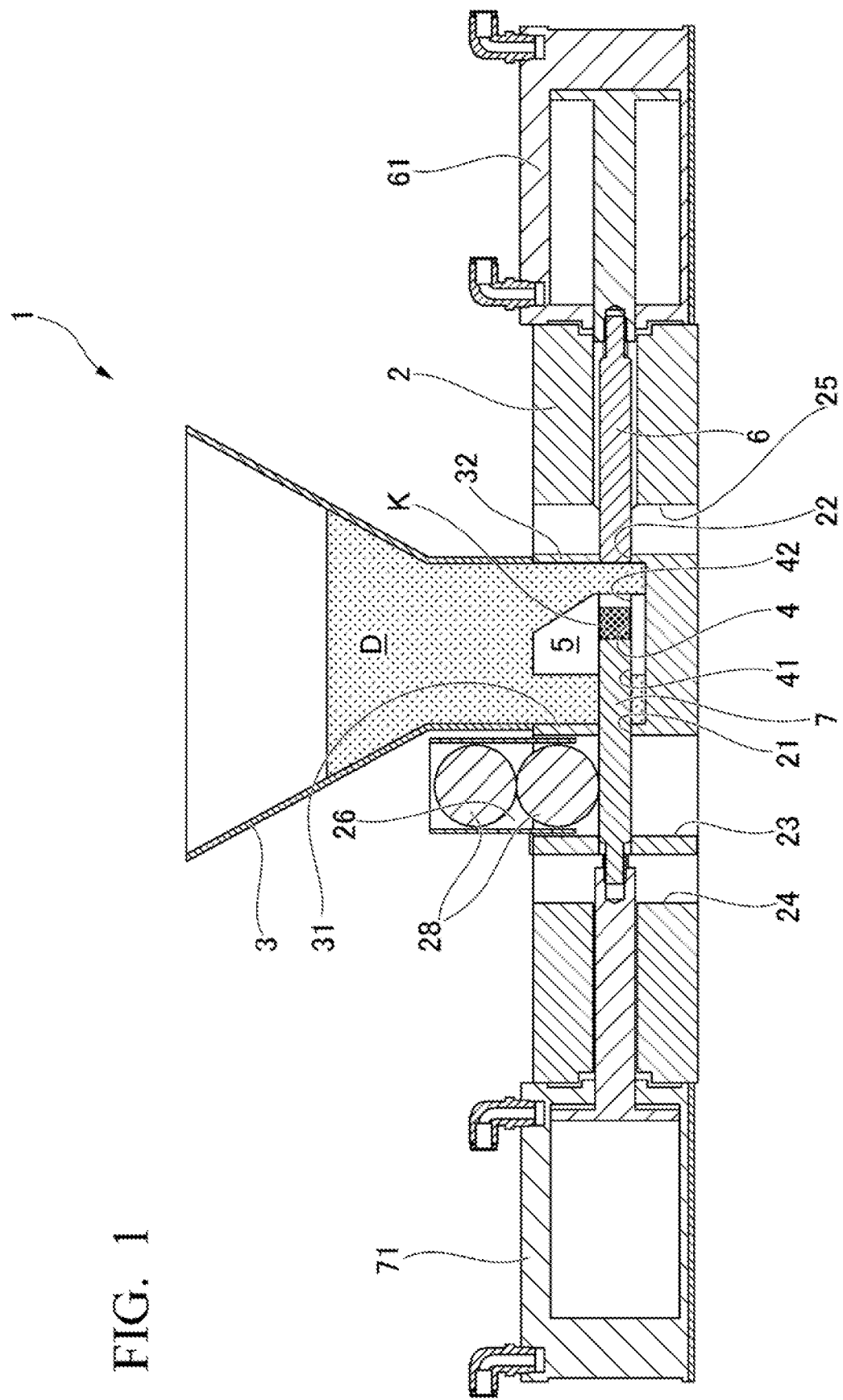
FIG. 1 is a side cross-sectional view of a dust solidification apparatus shown as an embodiment of the present invention.

Hereinafter, embodiments of the present invention will be described with reference to the drawings. FIG. 1 is a side cross-sectional view of a dust solidification apparatus of the present embodiment.

As shown in FIG. 1, a dust solidification apparatus 1 comprises an apparatus body 2; a hopper 3 for storing dust D, the hopper being provided on the apparatus body 2; a forming member 5 provided within the hopper 3, the forming member 5 having a forming hole 4; a pressurizing rod 6 that is configured to freely advance and withdraw with respect to the forming hole 4; a closing rod 7 facing the pressurizing rod 6; a pressurizing rod driving cylinder 61 for driving the pressurizing rod 6; and a closing rod driving cylinder 71 for driving the closing rod 7. The dust solidification apparatus 1 is configured to advance the pressurizing rod 6 into the forming hole 4 to solidify the dust D loaded therein, thereby obtaining a solidified substance K.

The forming hole 4 has a structure that penetrates through the forming member 5, the closing rod 7 freely advances into and withdraws from a first opening 41 of the forming hole 4, and the pressurizing rod 6 freely advances into and withdraws from a second opening 42 of the forming hole.

A first wall 31 and a second wall 32 of the apparatus body 2 are provided facing the first opening 41 and the second opening 42 of the forming hole 4, respectively. On the first wall 31 and the second wall 32, a first hole 21 and a second hole 22 that are each positioned on an axis of the forming hole 4 and that have one or both of the closing rod 7 and the pressurizing rod 6 reciprocating therein are formed, and the solidified substance K solidified within the forming hole 4 is transportable to the outside of the hopper 3 through the first hole 21 together with the closing rod 7 and the pressurizing rod 6. Additionally, the first wall 31 and the second wall 32 also constitute side walls within the hopper 3.

In the apparatus body 2, a discharge hole 23 that intersects with the first hole 21 and that extends in a vertical direction is formed proximate to the outside of the hopper 3. Although details of the operation of the dust solidification apparatus 1 will be described later, when the solidified substance K sandwiched between the closing rod 7 and the pressurizing rod 6 is moved into the discharge hole 23, the solidified substance K is dropped into and discharged by the discharge hole 23.

Additionally, in the apparatus body 2, dust-proof holes 24, 25 that intersect with the first hole 21 and the second hole 22 and that extend in a vertical direction are formed proximate to the hopper 3 and the discharge hole 23.

Moreover, the discharge hole 23 intersects with the first hole 21 and extends in the vertical direction as described above, wherein the upper portion of the first hole 21 is a weight applying member arrangement portion 26, and the lower portion of the first hole is formed so as to be the discharge hole 23. In the weight applying member arrangement portion 26, a weight applying member 28 is provided, wherein the weight applying member 28 rolls freely over the pressurizing rod 6 and the closing rod 7 when the pressurizing rod 6, the closing rod 7, and the solidified substance K sandwiched therebetween move within the first hole 21, and discharges the solidified substance K to the side of the discharge hole 23 when the weight applying member 28 is positioned over the solidified substance K. In the present embodiment, the weight applying member 28 is a cylindrical member having a weight equal to or greater than a certain value, wherein two of them are stacked vertically in the weight applying member arrangement portion 26.

Figure 2:
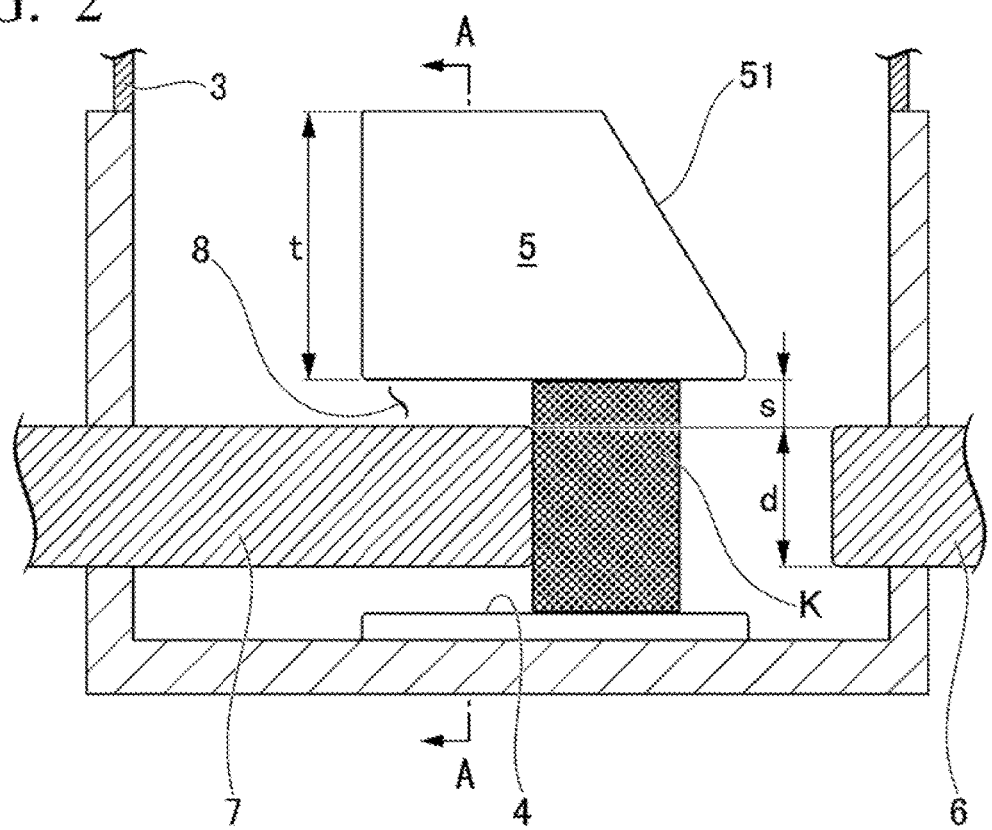
FIG. 2 is an enlarged side cross-sectional view for illustrating the structure of a pressurizing rod, a closing rod, and a forming hole of the dust solidification apparatus shown in FIG. 1.
Figure 9:
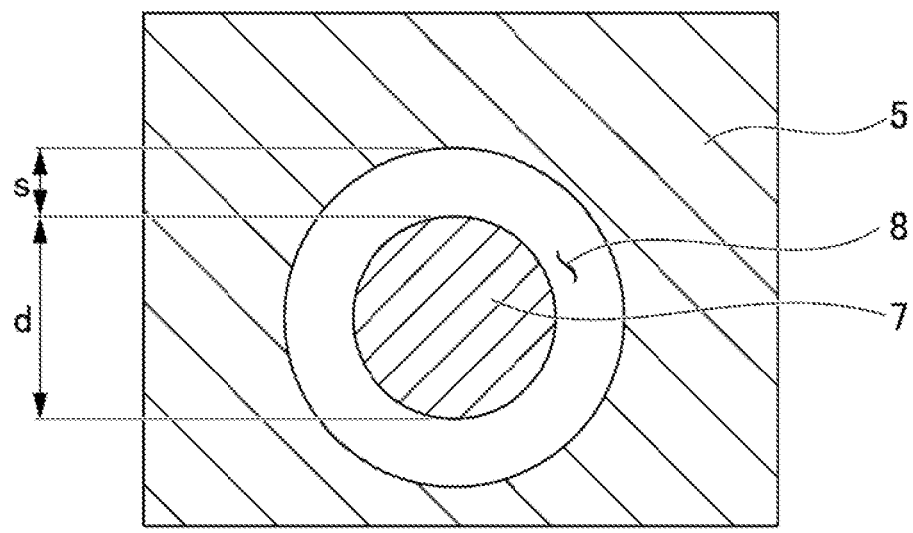
FIG. 9 is an A-A cross-sectional arrow view of FIG. 2 of a forming member in the embodiment of the present invention.

FIG. 2 is an enlarged view of a portion including the forming hole 4 of the forming member 5, the pressurizing rod 6, and the closing rod 7 in FIG. 1. FIG. 9 is an A-A cross-sectional arrow view of FIG. 2. In the present embodiment, the pressurizing rod 6 and the closing rod 7 have a circular cross-sectional shape with a diameter d, and a gap 8 is provided between the two rods 6, 7 and the forming hole 4. An inclined surface 51 is formed on the forming member 5 so that the dust within the hopper 3 moves smoothly from an upper part to a lower part. Since FIG. 2 is illustrated for the purpose of clarifying the positional relationship of the pressurizing rod 6, the closing rod 7, and the forming hole of the forming member 5, the dust D is omitted and the gap 8 is exaggerated.

Next, FIG. 3 to FIG. 8 are enlarged views of a portion including the forming member 5 within the hopper 3 in FIG. 1. Referring to these figures, the operation of the dust solidification apparatus 1 will be described.

Figure 3:
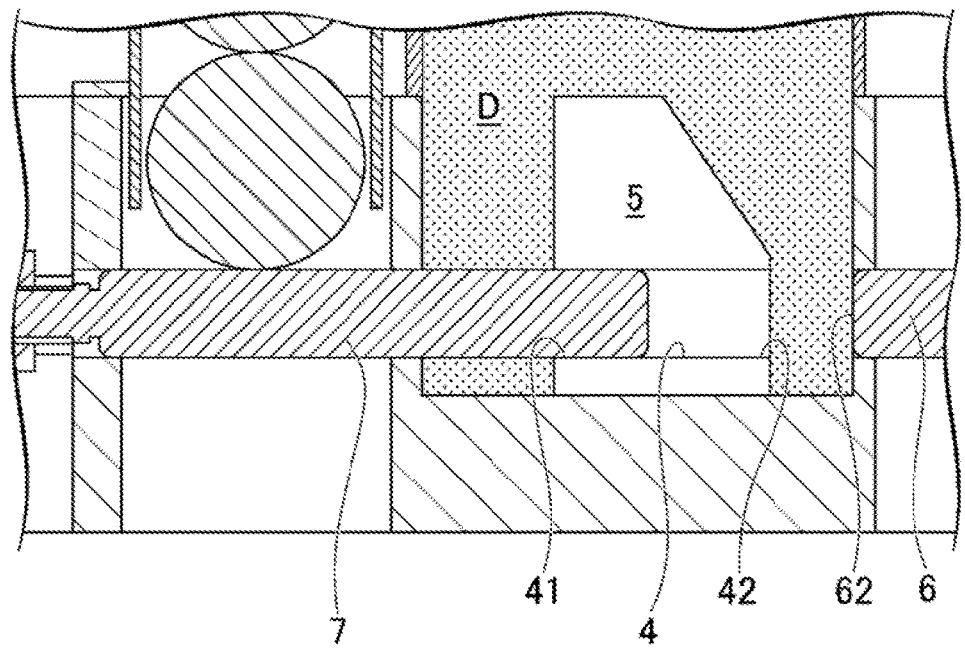
FIG. 3 is an enlarged side cross-sectional view for illustrating the operation of the dust solidification apparatus shown in FIG. 1.

(1) Referring to FIG. 3, in this state, the closing rod 7 is positioned stationary in the forming hole 4 of the forming member 5. The pressurizing rod 6 moves outside the forming hole 4, and the dust D is present between a pressurizing surface 62 of the pressurizing rod 6 and the closing rod 7.

Figure 4:
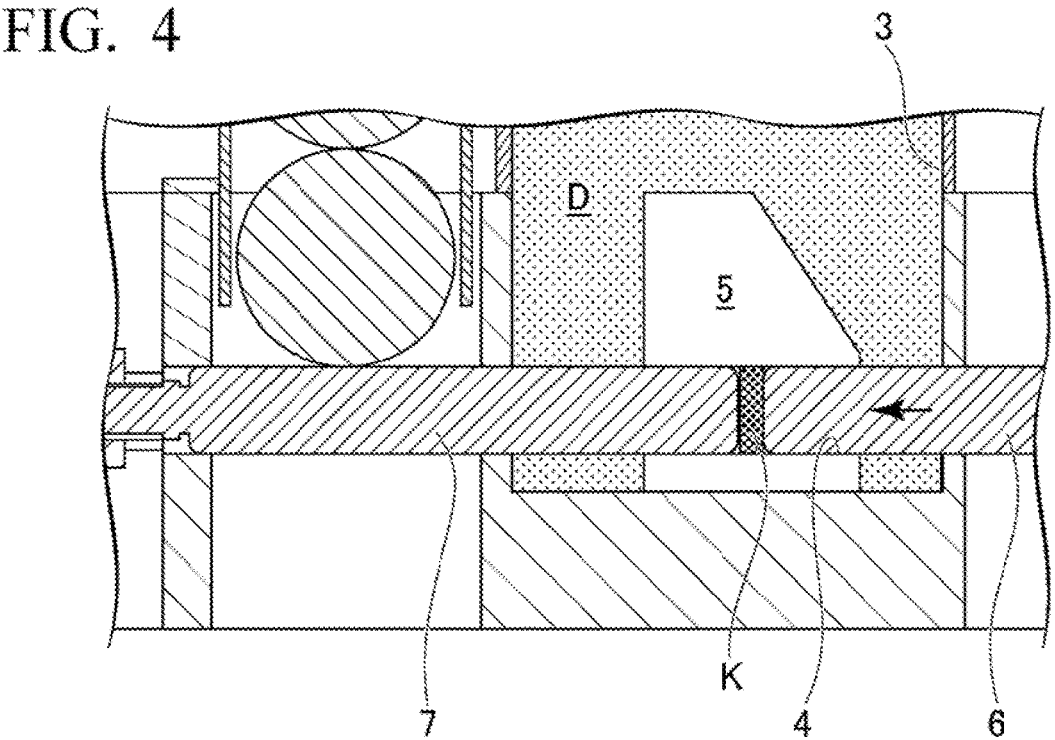
FIG. 4 is an enlarged side cross-sectional view for illustrating the operation of the dust solidification apparatus shown in FIG. 1.

(2) Referring to FIG. 4, when the pressurizing rod 6 is moved from the state of FIG. 3 to within the forming hole 4, the dust D is pressed into the forming hole 4, and by further moving the pressurizing rod 6 toward the closing rod 7 facing the pressurizing rod 6, the dust D is pressed and compacted, thereby forming a solidified substance K. At this point, even if the dust D leaks out from the forming hole 4 through the gap 8 shown in FIG. 2, since the openings 41, 42 of the forming hole 4 are open within the hopper 3, the dust D will not flow outside the solidification apparatus 1.

Figure 5:
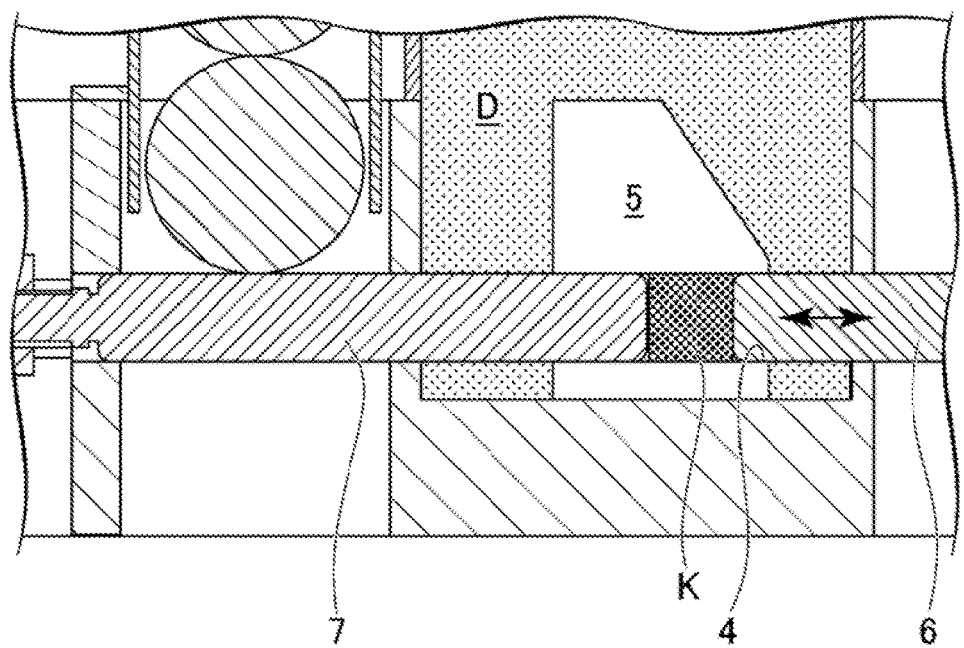
FIG. 5 is an enlarged side cross-sectional view for illustrating the operation of the dust solidification apparatus shown in FIG. 1.

(3) Referring to FIG. 5, by repeating the operations of (1) and (2), the dust D is further pushed into the forming hole 4, thereby forming a larger solidified substance K. Even if the operation of pressing and compacting the solidified substance K is repeated as described above, the dust D will not flow outside the solidification apparatus 1 due to the same reason as in (2).

Figure 6:
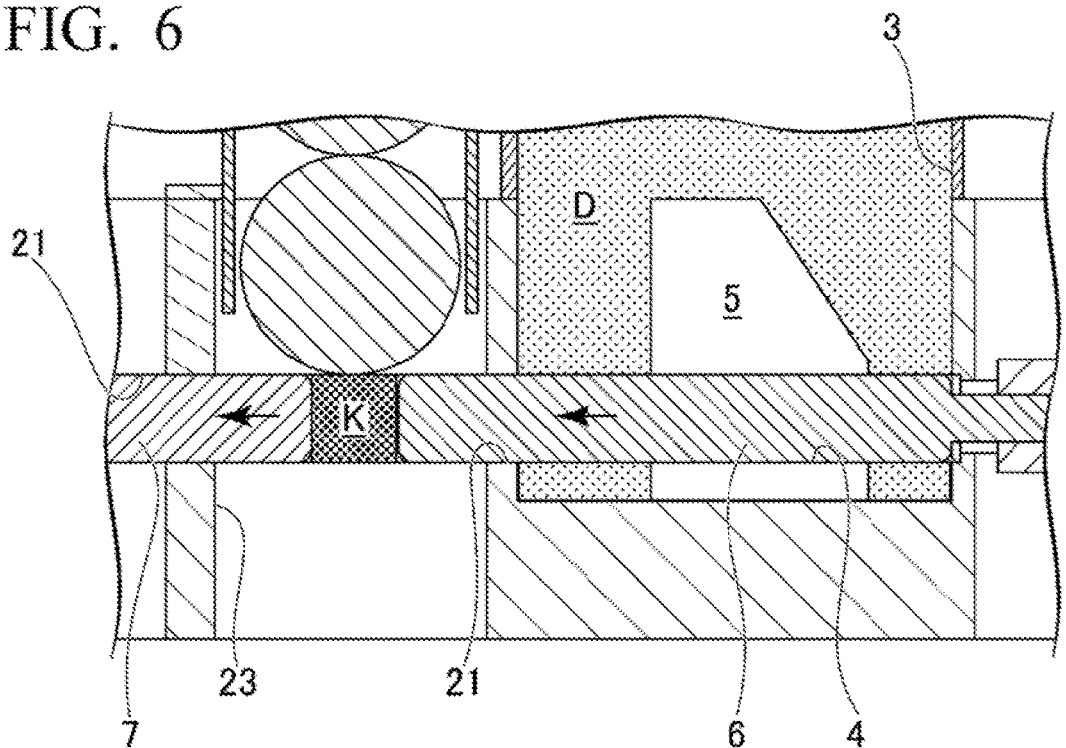
FIG. 6 is an enlarged side cross-sectional view for illustrating the operation of the dust solidification apparatus shown in FIG. 1.

(4) Referring to FIG. 6, when the solidified substance K reaches a predetermined size by repeating the above operations, the closing rod 7 and the pressurizing rod 6 sandwiching the solidified substance K therebetween move at the same time within the first hole 21 toward the outside of the hopper 3 (the left side of the drawing). At the place where the closing rod 7 and the pressurizing rod 6 sandwiching the solidified substance K therebetween moves to, a discharge hole 23 that intersects with the first hole 21 and that extends in a vertical direction is provided. The solidified substance K is placed stationary in the discharge hole 23 by the closing rod 7 and the pressurizing rod 6.

Figure 7:
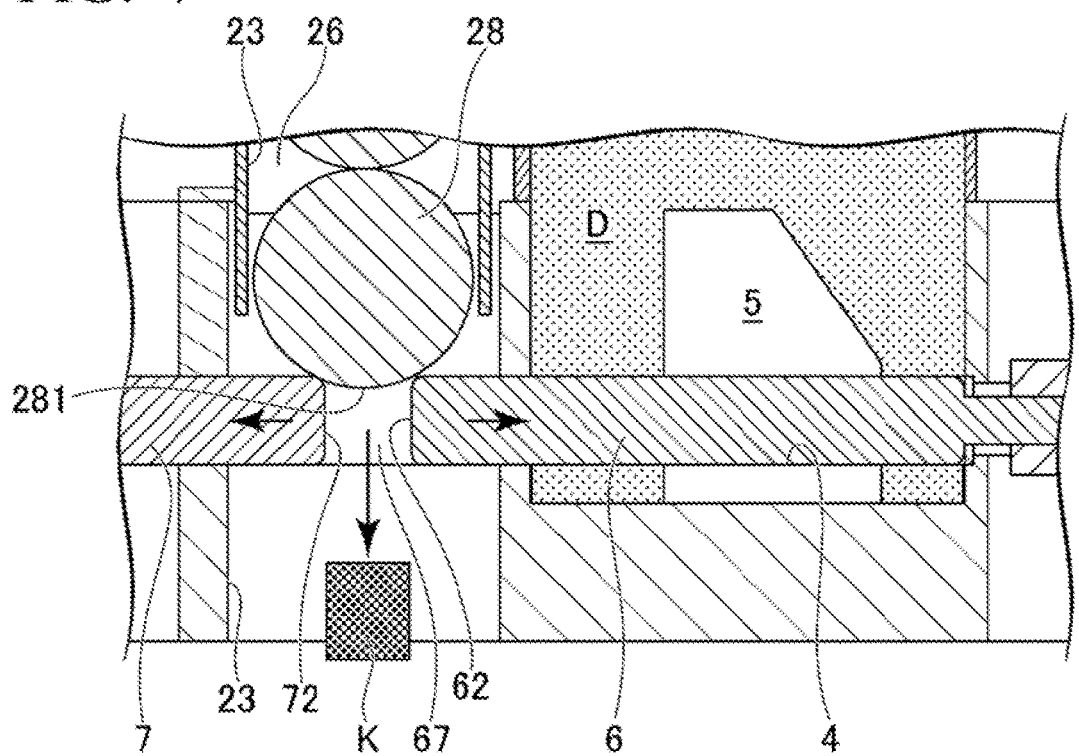
FIG. 7 is an enlarged side cross-sectional view for illustrating the operation of the dust solidification apparatus shown in FIG. 1.

(5) Referring to FIG. 7, as described above, at the upper side of the discharge hole 23, weight applying members 28 are arranged over the pressurizing rod 6 and the closing rod 7 in a freely rollable state, and when the closing rod 7 moves, the weight applying members 28 having a cylindrical shape rotate in accordance with the movement of the closing rod 7, due to contact with the closing rod 7. Here, when one or both of the pressurizing rod 6 and the closing rod 7 are slightly withdrawn with respect to the solidified substance K to weaken the force sandwiching the solidified substance K, a cylindrical surface 281 of the weight applying member 28 protruding in a curved state fits in a space 67 between the pressurizing rod 6 and the closing rod 7, thereby pushing the solidified substance K toward the lower side of the discharge hole 23. The solidified substance K that has been pushed detaches from the pressurizing surface 62 of the pressurizing rod 6 and a pressurizing surface 72 of the closing rod 7, and is discharged to the lower side of the discharge hole 23.

Figure 8:
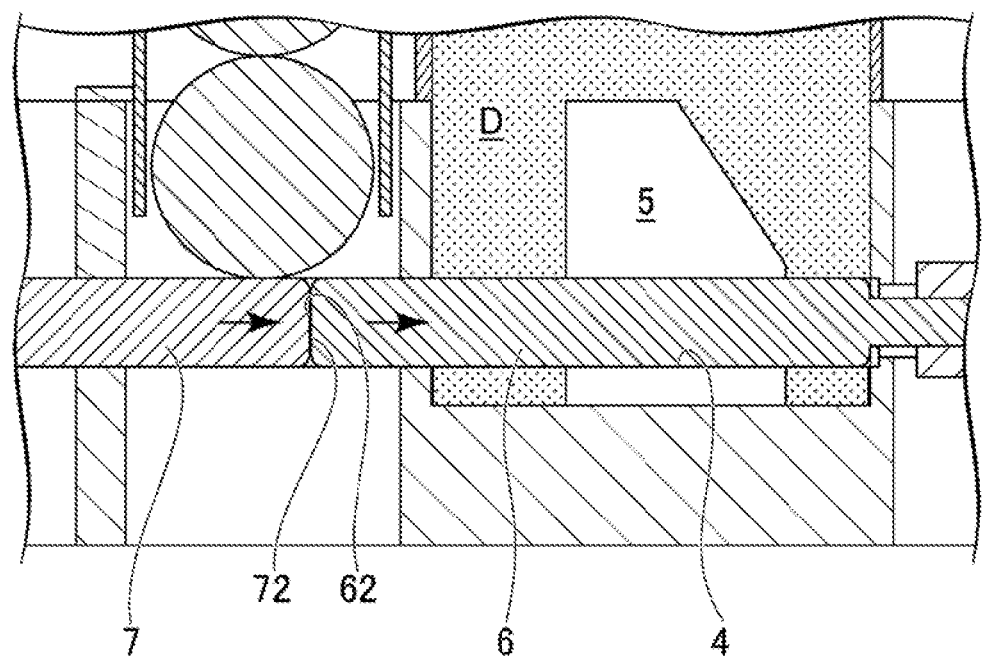
FIG. 8 is an enlarged side cross-sectional view for illustrating the operation of the dust solidification apparatus shown in FIG. 1.

(6) Referring to FIG. 8, after the solidified substance K is discharged, the pressurizing rod 6 and the closing rod 7 move in a direction that their pressurizing surfaces 62, 72 approach each other, and then they move into the forming hole 4 of the forming member 5 in a state where the pressurizing surface 62 of the pressurizing rod 6 and the pressurizing surface 72 of the closing rod 7 contact each other. After the pressurizing surfaces 62, 72 of these two rods move while being in contact with each other and are positioned in the forming hole 4, the closing rod 7 remains stationary in that position, and the pressurizing surface 62 of the pressurizing rod 6 moves further outside the forming hole 4 and then stops after moving to the position in FIG. 3.

By repeating the steps of (1) to (6) described above, the solidified substance K of the dust D is continuously formed.

As described above, in the present embodiment, since the openings 41 and 42 of the forming hole 4, which forms the dust D into a solidified substance K, are open within the hopper, the dust D that scatters during its solidification can be confined in the hopper 3. Therefore, dust scattering and dust solidification can be accurately carried out using a simple structure, without the need to provide a mechanism for protecting against and collecting waste particles containing dust that scatters during solidification.

The scattering of dust during the pressurizing operation of the rods is confined within the hopper, so a desired gap can be provided between the forming hole 4 and each of the pressurizing rod 6 and the closing rod 7. Therefore, the gap can be set arbitrarily so as to make the movement of the rods during solidification smooth. Since dust-proof holes 24, 25 are provided in the path of the first hole 21 and the second hole 22 where the pressurizing rod 6 and the closing rod 7 move in the left and right directions according to the drawing of FIG. 1, the dust D adhering to the rods 6, 7 detaches in the dust-proof holes, thereby preventing damage to the driving cylinders 61, 71.

MODIFIED EXAMPLES

Figure 10:
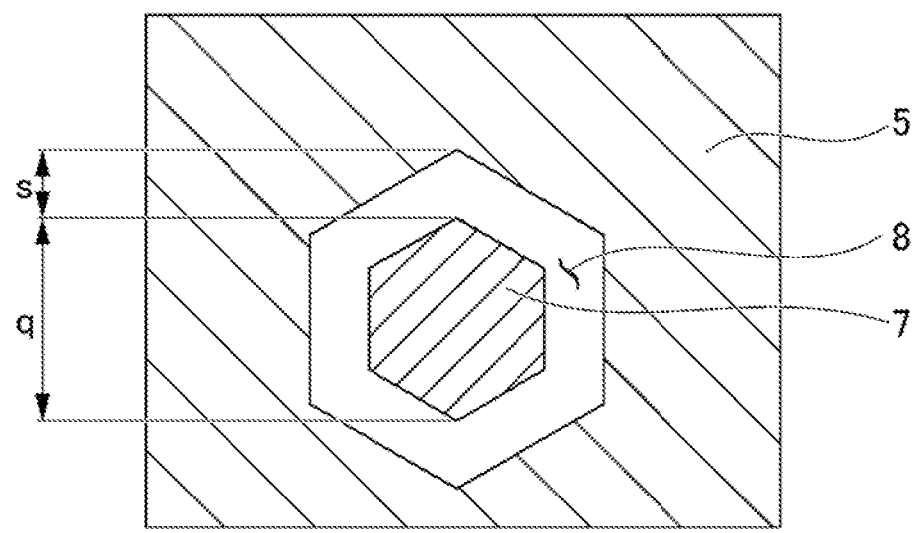
FIG. 10 is an A-A cross-sectional arrow view of FIG. 2 of a forming member in a modified example of the present invention.

FIG. 10 is an A-A cross-sectional arrow view of FIG. 2 of the present modified example. Although in the above embodiment, the pressurizing rod 6 and the closing rod 7 had a circular cross-sectional shape, the present modified example employs a regular hexagonal shape. Other configurations and operations are the same as the above-described embodiments, and the same functions and effects can be obtained.

Although the above-mentioned embodiments and modified example employ a circular or a regular hexagonal shape as the cross-section of the closing rod 7 and the pressurizing rod 6, the cross-sectional shape of the rods is not limited thereto, and any polygon may be employed as the cross-sectional shape of the rods.

In FIG. 9 and FIG. 10, the closing rod and the pressurizing rod 6 may be formed so as to have a maximum dimension, through the center of the cross-section, of 10 mm to 100 mm. The forming hole 4 may be formed so as to have a gap of 0.2 mm to 2 mm with respect to the closing rod and the pressurizing rod. By employing a dimension having such a range, the forming hole 4, the pressurizing rod 6, and the closing rod 7 can be easily made regardless of the exact dimensions, and the solidified substance K can be solidified efficiently.

In the above-described embodiment, as shown in FIG. 2, although the shape of the upper portion of the forming member is formed so it has an inclined surface 51, the shape is not limited thereto, and the forming member may be formed without an inclined surface. Moreover, the thickness t of the upper portion of the forming member 5 in FIG. 2 is arbitrary, and the forming member 5 can be set to an appropriate thickness and shape including whether to have the above-mentioned inclined surface or not, so the dust D is loaded into the forming hole 4 efficiently by reciprocation of the pressurizing rod 6.

Additionally, in the present embodiment, although the discharge hole 23 is provided so as to intersect with the first hole 21, it can be provided so as to intersect with the second hole 22. In that case, the formed solidified substance K is sandwiched and transported by the pressurizing rod 6 and closing rod 7 through the second hole to the discharge hole 23. Although the dust-proof holes 24, 25 that intersect with the first hole 21 and the second hole 22 are provided proximate to the discharge hole 23 and the hopper 3, both of them may be provided proximate to the hopper 3. Moreover, when the discharge hole 23 also serves the function of dust-proof holes 24, 25, a dust-proof hole does not need to be provided at a side where the discharge hole 23 is provided.

In the present embodiment, although the first hole 21 and the second hole 22 are formed so as to extend in a horizontal direction, upon considering the efficiency to push the dust D into the forming hole 4, they may be formed so as to extend in a direction inclined with respect to the horizontal direction.

In the present embodiment, although the weight applying member 28 has a configuration where two of the members are stacked vertically, the configuration is not limited thereto, and one or more may be selected arbitrarily according to the applications thereof.

Moreover, in the present embodiment, although the solidified substance K is formed by the reciprocation of the pressurizing rod 6 while the closing rod 7 remains stationary, without being limited thereto, the dust D can be can be solidified by the reciprocation of both the closing rod 7 and the pressurizing rod 6 to form a solidified material K. Here, the closing rod 7 and the pressurizing rod 6 are named simply based on the operations in the embodiments, and the control can be reversed, for example, so a solidified substance K can be formed even if the closing rod 7 is controlled so as to perform the work of pressing.

REFERENCE SIGNS LIST

1 Dust solidification apparatus
2 Apparatus body
21 First hole
22 Second hole
23 Discharge hole
24, 25 Dust-proof hole
3 Hopper
31 First wall
32 Second wall
4 Forming hole
41 First opening
42 Second opening
5 Forming member
6 Pressurizing rod
7 Closing rod
8 Gap between the rod and the forming hole
D Dust
K Solidified substance

The invention claimed is:

1. A dust solidification apparatus comprising:
an apparatus body;
a hopper for storing dust, the hopper being provided on the apparatus body;
a forming member provided within the hopper, the forming member having a forming hole;
a pressurizing rod that is configured to freely advance and withdraw with respect to the forming hole,
a closing rod facing the pressurizing rod,
wherein the pressurizing rod advances into the forming hole to solidify dust loaded therein, thereby obtaining a solidified substance,
the forming hole has first and second openings that are open within the hopper,
the forming hole is a structure that penetrates through the forming member, and
the forming member has an inclined surface.

2. The dust solidification apparatus according to claim 1, wherein
the closing rod is configured to freely advance into and withdraw from the first opening of the forming hole, and
the pressurizing rod is configured to freely advance into and withdraw from the second opening of the forming hole.

3. The dust solidification apparatus according to claim 2, wherein a first wall and a second wall are provided facing the first opening and the second opening of the forming hole, respectively,
a first hole and a second hole that are each positioned on an axis of the forming hole and that have one or both of the closing rod and the pressurizing rod reciprocating therein are formed on the first wall and the second wall, and
the solidified substance solidified by the pressurizing rod and the closing rod within the forming hole is transportable to the outside of the hopper through the first hole or the second hole together with the closing rod and the pressurizing rod.

4. The dust solidification apparatus according to claim 3, wherein a discharge hole that intersects with the first hole or the second hole and that extends in a vertical direction is formed in the apparatus body, proximate to the outside of the hopper, and
when the solidified substance sandwiched between the closing rod and the pressurizing rod is moved into the discharge hole, the solidified substance is dropped into and discharged by the discharge hole.

5. The dust solidification apparatus according to claim 4, wherein a dust-proof hole that intersects with the first hole and the second hole and that extends in a vertical direction is formed in the apparatus body, proximate to the hopper and/or the discharge hole.

6. The dust solidification apparatus according to claim 2, wherein the closing rod and the pressurizing rod have a cross-section formed into a circular or polygonal contour shape.

7. The dust solidification apparatus according to claim 2, wherein the closing rod and the pressurizing rod are formed so as to have a maximum dimension, through the center of the cross-section, of 10 mm to 100 mm, and the forming hole is formed so as to have a gap of 0.2 mm to 2 mm with respect to the closing rod and the pressurizing rod.

* * * * *